(12) United States Patent
Zhou et al.

(10) Patent No.: US 11,416,554 B2
(45) Date of Patent: Aug. 16, 2022

(54) GENERATING CONTEXT RELEVANT SEARCH RESULTS

(71) Applicant: COUPANG CORP., Seoul (KR)

(72) Inventors: Jie Zhou, Seoul (KR); Kyung Hoon Min, Gyeonggi-do (KR); Sung Han Kim, Seoul (KR); Chunyan Li, Shanghai (CN); Seung Won Lee, Gyeonggi-do (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/016,703

(22) Filed: Sep. 10, 2020

(65) Prior Publication Data
US 2022/0075827 A1    Mar. 10, 2022

(51) Int. Cl.
*G06F 16/9032* (2019.01)
*G06N 20/00* (2019.01)
*G06F 16/903* (2019.01)
*G06Q 30/06* (2012.01)

(52) U.S. Cl.
CPC .. *G06F 16/90328* (2019.01); *G06F 16/90344* (2019.01); *G06N 20/00* (2019.01); *G06Q 30/0631* (2013.01)

(58) Field of Classification Search
CPC ........ G06F 16/90328; G06F 16/90344; G06N 20/00; G06Q 30/0631
See application file for complete search history.

(56) References Cited

U.S. PATENT DOCUMENTS 10,607,277 B2    3/2020   Leong et al.
2004/0064447 A1*  4/2004  Simske ............... G06F 16/3344
                                                707/999.005
(Continued)

FOREIGN PATENT DOCUMENTS

JP    2017102963    6/2017
KR    20160016887 A    2/2016
(Continued)

OTHER PUBLICATIONS

Jin, Wei, et al., "OpinionMiner: A Novel Machine Learning System for Web Opinion Mining and Extraction", ACM KDD '09, pp. 1195-1203. (Year: 2009).*

(Continued)

*Primary Examiner* — Scott A. Waldron
(74) *Attorney, Agent, or Firm* — Finnegan, Henderson, Farabow, Garrett & Dunner, LLP

(57) ABSTRACT

A method of generating search results, comprising; receiving, by a computing system, an instruction to generate search results relating to a SKU stored in a database; extracting, by the computing system, a context based on information relating to the SKU; generating, by the computing system, a dynamic search string, by: generating a key based on the instruction; identifying a dictionary based on the context, the dictionary containing a plurality of dictionary term; and generating the dynamic search string by determining the dictionary term corresponding to the key; searching, by the computing system, using the dynamic search string, in content data; returning results from the content data matching the dynamic search string; and generating for display on a client device, the results.

15 Claims, 11 Drawing Sheets

(56) References Cited

U.S. PATENT DOCUMENTS

| | | | | |
|---|---|---|---|---|
| 2006/0253427 | A1* | 11/2006 | Wu | G06F 16/3322 707/999.003 |
| 2012/0117102 | A1* | 5/2012 | Meyerzon | G06F 16/3322 707/767 |
| 2012/0296926 | A1* | 11/2012 | Kalin | G06F 16/951 707/765 |
| 2014/0164097 | A1 | 6/2014 | Stoikovitch | |
| 2020/0242648 | A1 | 7/2020 | Glazier et al. | |

FOREIGN PATENT DOCUMENTS

| | | |
|---|---|---|
| KR | 10-2058011 B1 | 12/2019 |
| WO | WO 2004055625 A2 | 7/2004 |

OTHER PUBLICATIONS

Mandal, Aritra, et al., "Query Rewriting Using Automatic Synonym Extraction for E-commerce Search", Proceedings of the SIGIR 2019 eCom Workshop, Jul. 2019, 7 pages. (Year: 2019).*

Raza, Muhammad Ahsan, et al., "A Taxonomy and Survey of Semantic Approaches for Query Expansion" in IEEE Access, vol. 7, pp. 17823-17833, Jan. 24, 2019, doi: 10.1109/ACCESS.2019.2894679. (Year: 2019).*

International Search Report and Written Opinion of the International Search Authority I counterpage application PCT/IB2020/059202, dated Jun. 7, 2021 (9 pages).

Notice of Allowance dated Apr. 22, 2022 in counterpart Korean Application No. 10-2021-7019376 (4 pages).

* cited by examiner

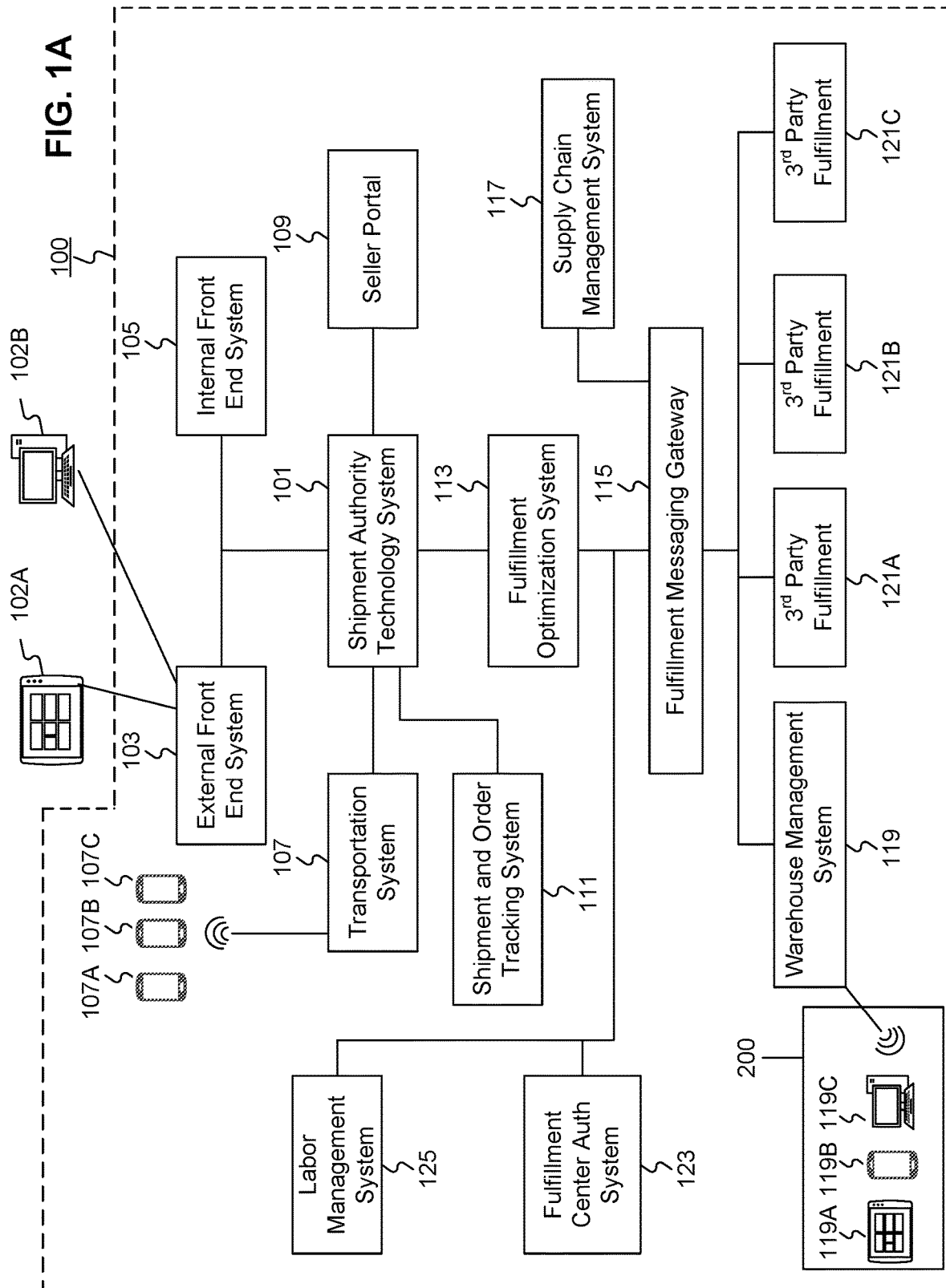

11/28/2018 Shopping Cart

| General Purchasing (1) | Periodic Delivery (0) |

☑ Select All    Product Information    Item Amount   shipping fee

Rocket shipping products  free shipping

☑ 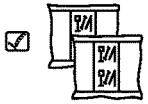 Mozzarella cheese, 1kg, 2 pieces
Tomorrow (Thursday) 11/29
Arrival guarantee (order before 12 pm)   
20,510 won       [ 1 ▼ ]   free

| Even if you add other rocket shipping products, free shipping available |   shipping Free   Order amount
$20.00

☑ Select All (1/1)  [ Delete all ]  [ sold out / discontinued products clear all ]   [ interest payment ]

$___.00

[ Continue shopping ]   [ Buy now ]

Customers who bought this product also purchased

1/5

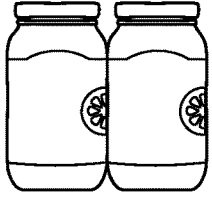   

Rosé spaghetti sauce, 600g, 2 pieces
6,500 won
(54 won per 10g)

Napoli Chunky Tomato Pasta Sauce,
3,800 won
(86 won per 10g)

Grated Parmesan cheese,
6,460 won
(285 won per 10g)

Bacon and Mushroom Cream Pasta Sauce,
4,870 won
(108 won per 10g)

FIG. 1D

GENERATING CONTEXT RELEVANT SEARCH RESULTS

TECHNICAL FIELD

The present disclosure generally relates to computerized systems and methods for generating context relevant search results. In particular, embodiments of the present disclosure relate to inventive and unconventional systems relate to improve relevancy of search results by retrieving information and data relevant to a context of the search.

BACKGROUND

In the field of on-line retail business, shoppers often base the selection of products to purchase by relying on reviews or comments left by other shoppers. These reviews may include some types of rating (e.g. stars, likes, points, etc.), and/or narrative texts. The narrative reviews may often be helpful to shoppers who may have questions about features, reliability, satisfaction level, and other qualitative descriptions which cannot be conveyed via a simple rating.

For some products, there may be dozens, or hundreds of reviews left by shoppers, so it is not practical or convenient for someone to read through every word. In those cases, shoppers may do a search for terms that they believe would be locate reviews relevant to their inquiry. Simple text searches for words, however, may only return the exact wording used in a search query, so if the shopper did not use a term that appeared in any reviews of the product, relevant information may not be located.

Existing search system is thus limited because the burden of finding useful reviews is on the shopper for coming up with the 'correct' searching term. Different shoppers may prefer to use different words to describe the same feature, thus when shopper A, who may use one word to describe some features of a product, searches for this feature among the reviews, may not be directed to a relevant review left by shopper B, who used a different word for the features in the review.

Therefore, there is a need for improved methods and systems with to ensure that relevant results may be captured even in the situation that a search query does not contain terms that appears relevant results.

SUMMARY

One aspect of the present disclosure is directed to a computerized method for a method of generating search results, comprising; receiving, by a computing system, an instruction to generate search results relating to a SKU stored in a database; extracting, by the computing system, a context based on information relating to the SKU; generating, by the computing system, a dynamic search string, by: generating a key based on the instruction; identifying a dictionary based on the context, the dictionary containing a plurality of dictionary term; and generating the dynamic search string by determining the dictionary term corresponding to the key; searching, by the computing system, using the dynamic search string, in content data; returning results from the content data matching the dynamic search string; and generating for display on a client device, the results.

Another aspect of the present disclosure is directed to a computer system for generating search results, comprising; one or more processors; memory storage media containing instructions to cause the one or more processors to execute the steps of: receiving, by a computing system, an instruction to generate search results relating to a SKU stored in a database; extracting, by the computing system, a context based on information relating to the SKU; generating, by the computing system, a dynamic search string, by: generating a key based on the instruction; identifying a dictionary based on the context, the dictionary containing a plurality of dictionary term; and generating the dynamic search string by determining the dictionary term corresponding to the key; searching, by the computing system, using the dynamic search string, in content data; returning results from the content data matching the dynamic search string; and generating for display on a client device, the results.

Yet another aspect of the present disclosure is directed to a computer system for generating contextual search results, comprising; one or more processors; memory storage media containing instructions to cause the one or more processors to execute the steps of: receiving, by a computing system, an instruction to generate search results relating to a SKU stored in a database; extracting, by the computing system, a contextual environment based on information relating to the SKU; generating, by the computing system, a dynamic search string, the generation comprises steps of: generate a key based on the instruction; identify a dictionary based on the contextual environment, the dictionary containing a plurality of dictionary terms, each containing a plurality of relevant terms; determine that the key corresponds to one of the dictionary terms based on a threshold number of matches of the key to the relevant terms; and generate the dynamic search string using the plurality of search terms of the corresponding dictionary terms; searching, by the computing system, using the dynamic search string, in content data associated with the SKU; returning results from the content data matching the terms of the dynamic search string; and generating for display on a client device, the results.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1D depicts a sample Cart page that includes items in a virtual shopping cart along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
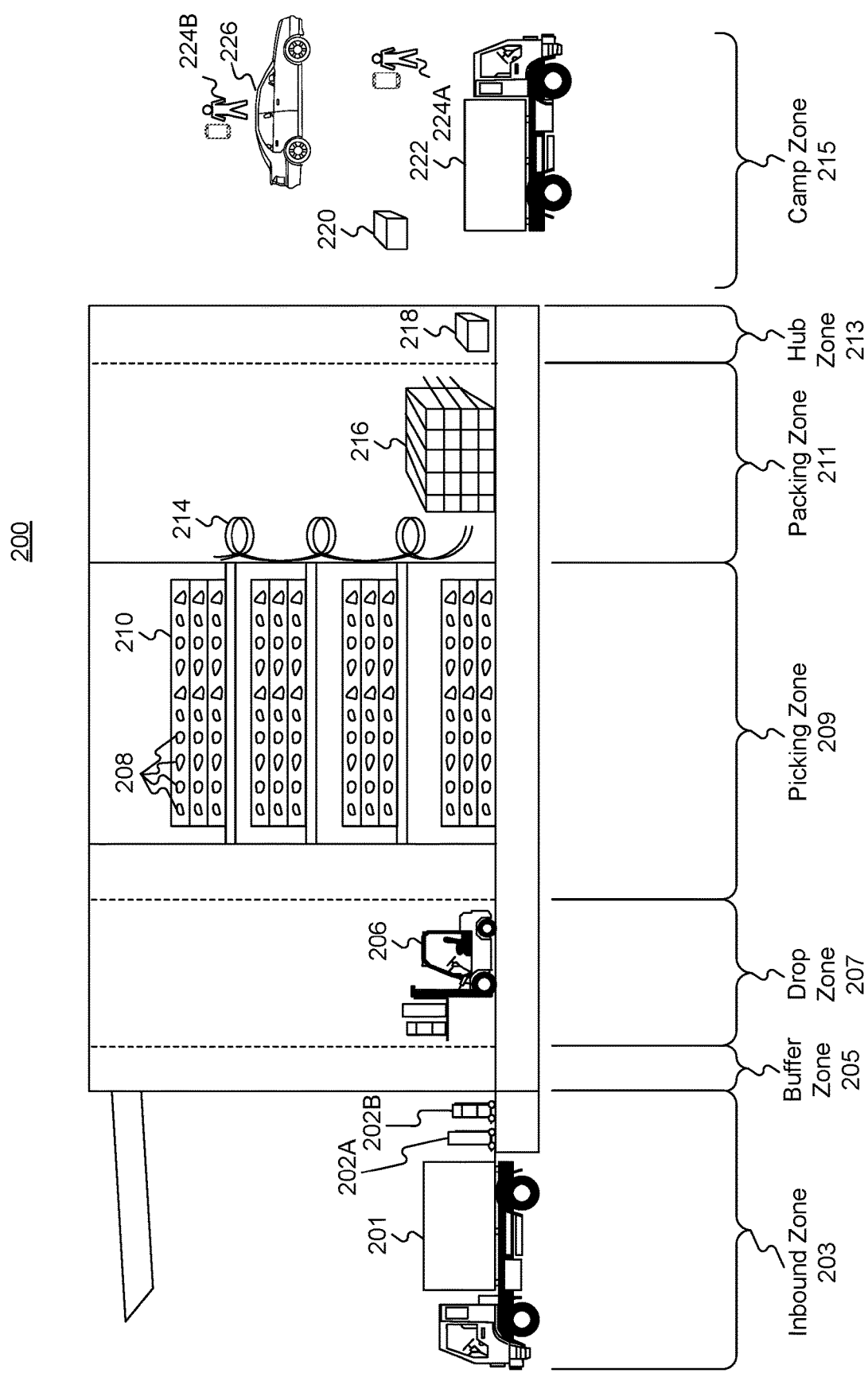
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to some embodiments of the present disclosure, system 100 may receive information and feedback from users using devices (e.g. 102A and 102B). The feedbacks may include user reviews for a product. Reviews may include ratings, such as a score, number of stars, likes, thumbs-up, etc. Reviews may also comprise narrative comments, such as texts describing user experiences, opinions, recommendations, complaints, and/or tips for using the product. Theses reviews may be displayed for viewing in user interfaces such as ones illustrated FIG. 1C, FIG. 5, and other suitable interfaces. When browsing through the products, a user may read the reviews to make informed purchasing decisions, or seek out tips or suggestions how to use or assemble the product. Usefulness of these reviews may be limited if the user cannot readily locate this useful information in the reviews. For example, a product may have many reviews, or that some users may leave extensive reviews detailing many aspects of a product, for which only a portion is relevant. Thus, it may be burdensome for someone to read through all of the reviews to locate the relevant information. In some instances, a user may search for the relevant information using text searches of key words, such that the user may be directed to the most relevant portions of the reviews. However, conventional keyword searching algorithms may be lacking because different users may use different terms to describe the same feature or aspect of a product, and thus a user may not be able to create search terms that are necessary to find all of the relevant information. Conventional systems for text search would not be able to understand or extract a context or intent from the user created search terms in order to search for a wider range of content in a database.

Figure 3:
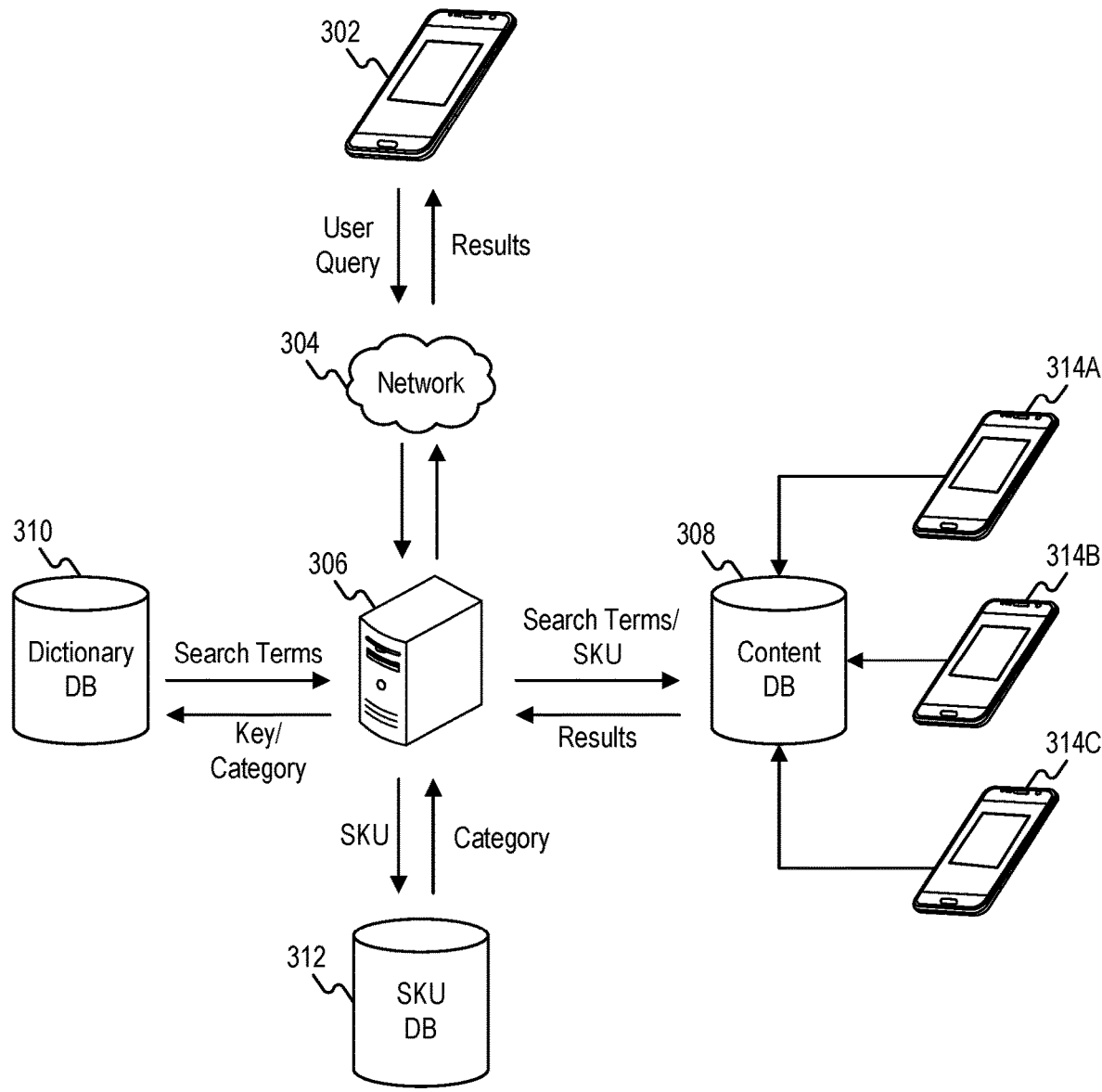
FIG. 3 depicts a schematic diagram of an exemplary system generating context relevant search results, consistent with the disclosed embodiments.

Accordingly, various embodiments of the present disclosure provide systems and methods for improve relevancy and completeness of search results. FIG. 3 depicts a schematic diagram of an exemplary system for generating context relevant search results, consistent with the disclosed embodiments. Device 302 may be a device associated with a user, or a "searcher," searching through the reviews for relevant information. Devices 314A-C may be devices associated with other users who provided the reviews, or "reviewers." The ratings and comments (i.e., reviews) provided by the reviewers may be stored in one or more databases, such as content DB 308. Devices 302 or 314A-C may be examples of user devices 102A and/or 102B. In some embodiments, the reviews may be stored or indexed as character strings, or in other formats searchable by one or more search algorithms.

The searcher may use device 302 to provide a "user query" to server 306. A user query may include terms, words and/or text strings containing one or more characters and/or punctuations, hereafter referred to as "user terms." In some embodiments, the user query may provide additional information to server 306, such as a product's stock keeping unit (SKU) or other identifier. SKUs are identifiers that may uniquely identify a product and its associated information stored in a database, such as SKU DB 312. The user query may be provided to server 306 via network 304. Server 306 may parse, edit, format or otherwise configure the user term into a key. A key may comprise a representation of a user term that are usable by the one or more search algorithms or engines of server 306.

Server 306 may be a computer system having one or more processors for carrying out instructions stored in one or more memory storage. Server 306 may also contain I/O section for receiving and sending data. Server 306 may be connected to one or more databases, such as content DB 308, dictionary DB 310, and SKU DB 312. In some embodiments, server 306 may represent one or more subsystem of system 100 depicted in FIG. 1A. Server 306 may be configured to execute one or more search algorithms or search engines. Examples of search engines or algorithms may include Apache Sol, ArangoSearch, Elasticsearch, Azure Search, Lucid, and/or other search algorithm or engine known in the art for carrying out text based searches. Server 306 may provide the received user query to SKU DB 312 to obtain information associated with the SKU corresponding to the user query, such as a "category" associated with the SKU.

A category may be a classification of a SKU. Examples of categories may include apparels, hardware tools, imaging equipment, video game system, mobile phone, lap-top computer, etc. In some embodiments, the category of a SKU may provide a context to the query. For example, the same user term, when used to describe two different products, may have different intended meaning by the searcher. Therefore, a user term should be treated differently by server 306 when directed to different products, or categories of products. Server 306 may provide the key and the category to dictionary DB 310 to access one or more dictionaries stored therein.

Figure 4:
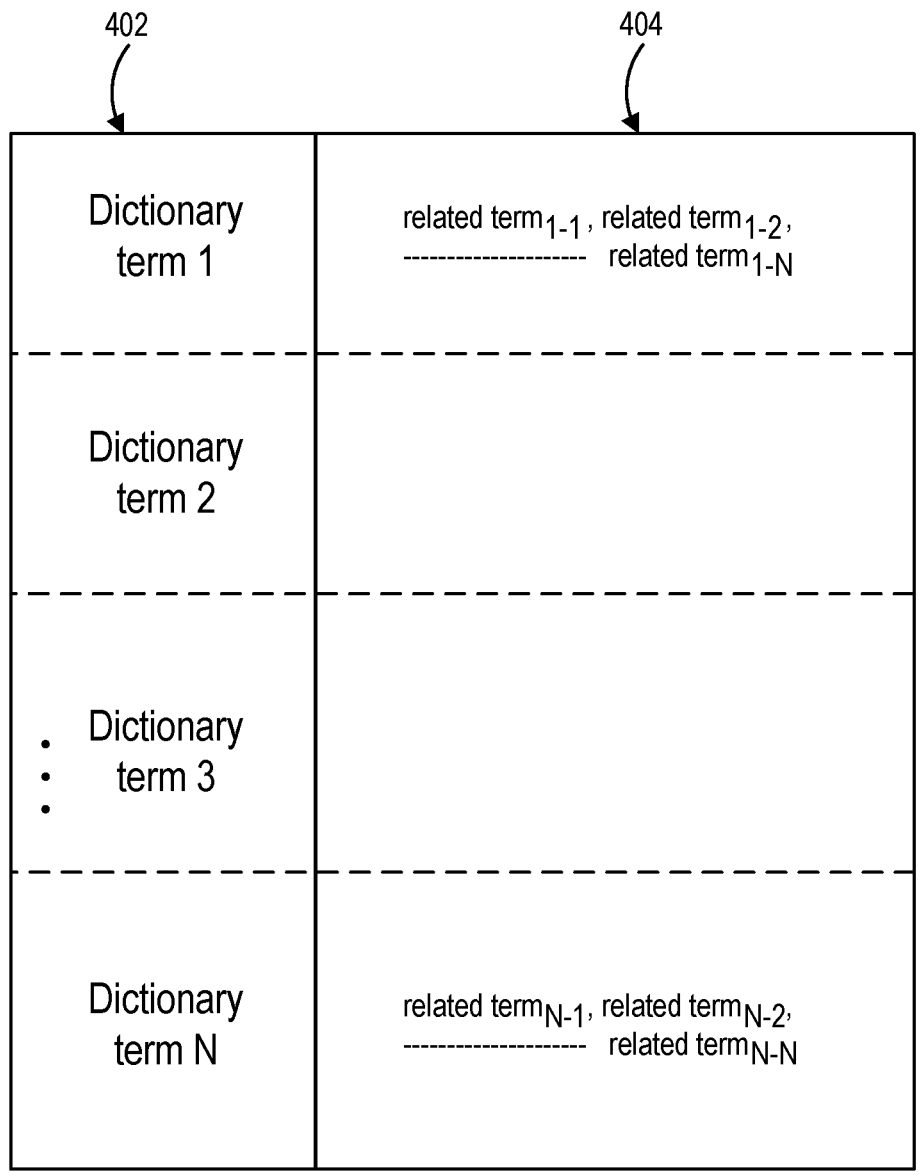
FIG. 4 depicts a table representation of an exemplary dictionary, consistent with the disclosed embodiments.

A dictionary may refer to a list or table of text strings. The dictionary relates various terms, words, and/or text strings to each other, such that server 306 may access related terms, words, and/or text strings using a single term, word and/or text string. By way of example, FIG. 4 depicts an exemplary dictionary 400 that may be stored in dictionary DB 310. Dictionary 400 may include column 402 and column 404. Values in column 402 may be referred to as a "dictionary term," such as dictionary term 1, dictionary term 2, . . . , and dictionary term N. A dictionary term may be a keyword that represent many keywords having similar or related meanings. For each dictionary term in column 402, there are corresponding related terms in column 404. For example, dictionary term 1 corresponds to related term 1-1, related term 1-2, . . . related term 1-N; . . . dictionary term N corresponds to related term N-1, related term N-2, . . . related term N-N, and so on. Each of the related terms corresponding to the same dictionary term are closely associated with each other, share similar meanings, or are often used together. For example, "texture" may be a dictionary term 402, and it may correspond to related terms 404 such as "fabric," "smooth," "soft," and "silk," with each related term being relevant to each other and the dictionary term. Thus, dictionary 400 should be structured such that if the key matches any one of the related terms (e.g. related term 1-1), all other related terms (e.g. related term 1-1, related term 1-2, . . . related term 1-N) of that dictionary term (e.g. dictionary term 1) may also be relevant to the searcher. In some embodiments, relevant terms may be extracted from reviews and comments stored in content DB 308.

In some embodiments, there may be two or more dictionaries. Each dictionary may be structured similar dictionary 400 depicted in FIG. 4. Different dictionaries stored in dictionary DB 310 may correspond to different contexts, and server 306 accesses the dictionary appropriate to the context. In some embodiments, the context depends on the category of the SKU, and server 306 accesses the dictionary based on the category retrieved from SKU DB 312. For example, in a dictionary assigned to apparels, the term "texture" may be associated with terms such as "fabric," "cardigan," "soft," "silk", and/or other similar terms often associated with clothing. In another dictionary assigned to mobile phones, the term "texture" may be associated with terms such as "metallic," "aluminum," "alloy," "smooth," "plastic," "matte," "finish," and/or other terms that may describe casings of mobile phones.

In some embodiments, the plurality of dictionaries may be generated by machine learning models. Machine learning (ML) may refer to systems and algorithm in which computer devices may learn to perform tasks without being explicitly programmed to do so. In context of the disclosed embodiments, text classifying ML models may be utilized to generate relations between relevant terms, and then classifying the relevant terms based on these relations. Text classification with machine learning may learn to make classifications based on past observations as pre-labeled training data. For example, past observation may be previous version of dictionaries. By using pre-labeled examples as training data, a machine learning algorithm can learn the different associations between pieces of text and that a particular output (i.e. dictionary term) is expected for a particular input (i.e. relevant term). In some embodiments, server 306 may contain one or more text extraction algorithms to extract relevant terms from the reviews and comments in content DB 308, and ML text classifier may group the extracted the relevant terms, and group them together as related terms under the same dictionary term. In some embodiments, server 306 may also add user terms provided by device 302 to the one or more dictionaries. For example, server 306 may store terms and words provided by the searchers, and ML text classifier may group these user terms with related terms together under the same dictionary term.

Server 306 may access dictionary DB 310 to retrieve search terms using the generated key and received category. Search terms may refer to character strings that server 306 uses to search for results in content DB 308. The search terms may be considered "dynamic" as they are dynamically determined based on the user query. Search terms may be the related terms contained in column 404. In some embodiments, server 306 performs a search using the key through all of the related terms in column 404. If the key matches any of the related terms in column 404, server 306 retrieves all of the related terms for the dictionary term corresponding to the match. For example, if server 306 finds that related term 1-4 matches the key, all related terms of dictionary term 1 (i.e. related term 1-1, 1-2, . . . , 1-N) are retrieved by server 306, and they become the search terms. In some embodiments, the key may contain more than one text string, and thus two or more matches may be found for related terms corresponding to two or more different dictionary terms. Server 306 may rank the matched dictionary terms based on a number of matches and retrieve the dictionary terms having the greatest number of matches. For example, if the key contains four text strings, and dictionary term 1 contains three related terms matching the key, and dictionary term 2 contains one related term matching the key, server 306 may retrieve the related terms corresponding to dictionary term 1 as search terms. In some embodiments, server 306 may determine that two or more dictionary terms and their corresponding relevant terms may be retrieved as search terms, the determination may be based on a threshold number of matches. For example if the threshold number of matches is two, and dictionary term 1 contains three related terms matching the key, and dictionary term 2 contains two related terms matching the key, server 306 may retrieve the related terms corresponding to both dictionary term 1 and dictionary term 2 as search terms.

Server 306 may perform searches using the search terms retrieved from dictionary DB 310 in content DB 308. Server 306 accesses content DB 308 and attempts to find matches in the reviews for the relevant SKU. When matches are found, server 306 retrieves results from content DB 308. In some embodiments, results may include the portion of reviews in which search terms matches the text strings of the reviews. Server 306 may return results to device 302 so that the reviews containing matches are displayed on device 302. In some embodiments, a matching portion of the text of the matched review may be highlighted, or otherwise distinguished when being displayed on device 302.

Figure 5:
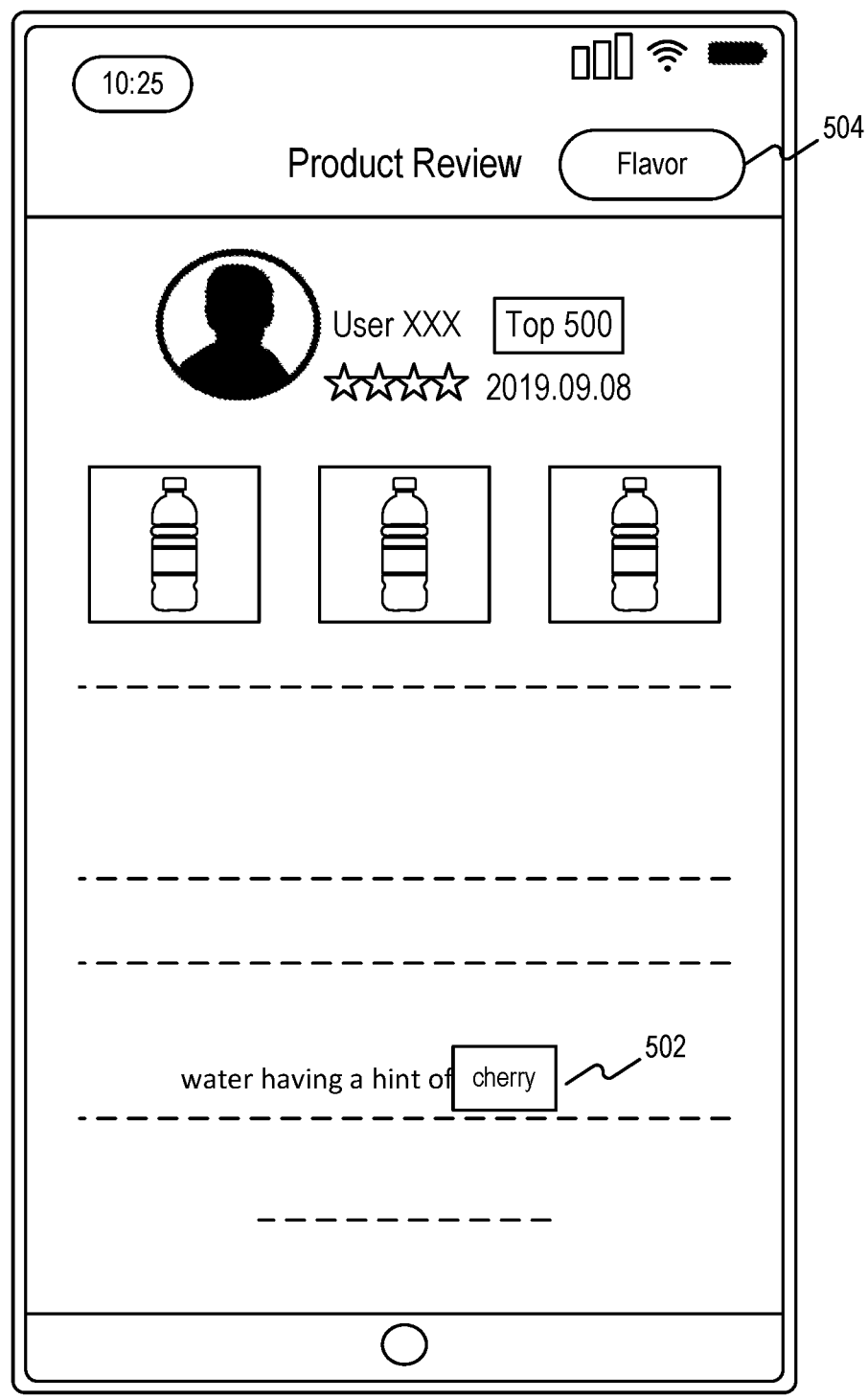
FIG. 5 depicts an exemplary user interface, consistent with the disclosed embodiments.

By way of example, FIG. 5 depicts an exemplary user interface 500, consistent with the disclosed embodiments. Result 502 represents texts in the portion of a review for a SKU received by device 302, in response to a user query. In some embodiments, result 502 may be highlighted, or otherwise made visually distinguishable from surrounding text, so that the searcher's attention in drawn to that portion of user interface 500. For example, when a searcher queries about the taste or flavor of the product depicted in FIG. 5, portion of the review containing a description of a taste, such as "cherry" may be highlighted as result 502.

According to some embodiments of the present disclosure, user query may contain one or more terms that are auto-generated. Auto-search term may refer to terms in the user query that is not created the searcher. In some embodiments, system 300 may provide to the searcher commonly searched terms for a particular SKU currently displayed. The auto-search term may be presented as a button that the searcher may click or press or interacted in some other suitable manner. Auto-search terms may allow for quicker and more efficient searching, since these terms may have pre-defined relations to one or more dictionary terms in dictionary DB 310, thus obviating the need for system 300 to attempt to match any user term in dictionary DB 310.

By way of example, FIG. 5 illustrates button 504, which may allow user to use an auto-search term. The auto-search term may be presented as a button that the searcher may click, press, or interacted in some other suitable manner. The auto-search term may also be presented on the user interfaces by alternative manners not illustrated, such as in a drop-down list, pop-up menu, hyper-linked texts, and/or other graphic interactive features. As depicted in FIG. 5, if the product in question is bottled water, users may often look for reviews regarding the flavor of the bottled water. Thus, instead of requiring users to provide their own terms or words to find reviews of the bottled water regarding flavor, button 504 may appear as "Flavor" on the user interface, indicating to the users that they may find the reviews regarding the flavor of the bottled water by pressing button 504, and thus the portion of the review containing a description of a taste, such as "cherry" may be highlighted as result 502.

Figure 6:
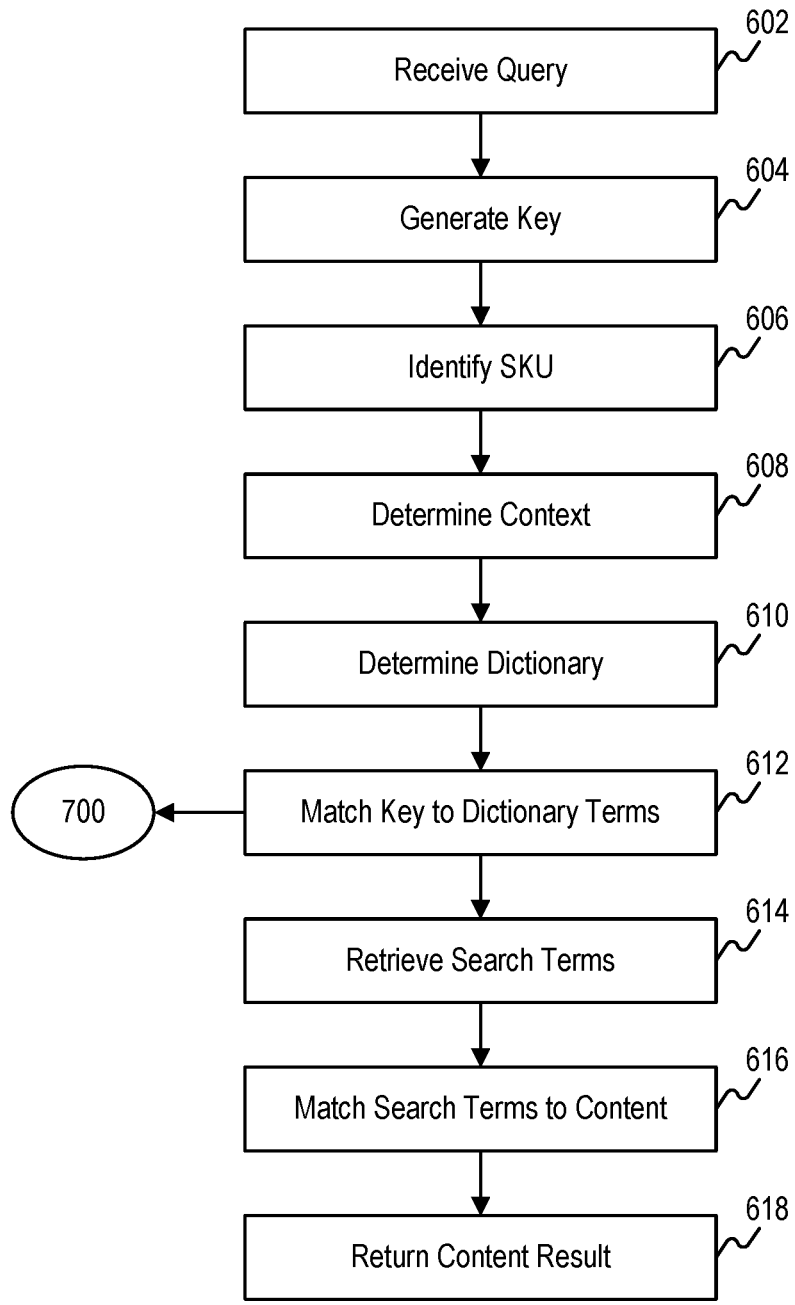
FIG. 6 depicts a flow chart of an exemplary process for generating context relevant search results, consistent with the disclosed embodiments.

FIG. 6 depicts a flow chart of an exemplary process for generating context relevant search results, consistent with the disclosed embodiments.

In step 602, server 306 receives a user query from device 302 via network 304. The user query may contain one or more user terms in forms of words, and/or text string provided by a searcher. The user query may also contain information regarding the SKU. In some embodiments, the user query may contain an auto-search term described above. A user query may include terms, words and/or text strings containing one or more characters and/or punctuation marks. The user query may additionally include additional information such as a product's stock keeping unit (SKU) or other identifiers.

In step 604, server 306 generates keys based on the user query. The keys may be formatted text strings usable by one or more searching algorithms. Examples of search engines or algorithms may include Apache Sol, ArangoSearch, Elasticsearch, Azure Search, Lucid, and/or other search algorithm or engine known in the art for carrying out text based searches. In some embodiments, the terms received from device 302 may be parsed and formatted to form keys, so that the one or more searching algorithms may use these keys to perform searches. For example, the terms received from device 302 may be formatted into regular expressions (regexes).

In step 606, server 306 identifies the SKU associated with the user query. In some embodiments, when user query is received, it may contain embedded data indicating the SKU associated with the user query. In some instances, the embedded data may indicate that the searcher is current viewing a webpage or an interface of a particular SKU. In some other instances, the embedded data may indicate that the searcher is actively performing searches the review section of the particular SKU.

In step 608, server 306 determines a context related to the user query. For example, the same user term, when used to describe two different products, may have different intended meaning by the searcher. Therefore, a user term should be treated differently by server 306 when directed to different products, or categories of products. In some embodiments, the context may be a category of the SKU. Examples of categories may include apparels, hardware tools, imaging equipment, video game system, mobile phone, lap-top computer, etc. In some embodiments, server 306 retrieves the category of the SKU identified in step 606 from SKU DB 312.

In step 610, server 306 determines a dictionary based on the determined context. In some embodiments, server 306 accesses one of the dictionaries stored in dictionary DB 310. Each of the dictionaries stored may be assigned to a specific category, thus server 306 may determine a dictionary based on the category determined in step 608.

In step 612, server 306 performs searches through the list of dictionary terms and related terms in the determined dictionary of step 610, for matches to the keys generated from user query in step 604. In some embodiments, server 306 determines that a dictionary term to be relevant to the user query. For example, the dictionary term containing related terms that match to the keys may be determined by server 306 as being relevant to the user query. In some instances, if two or more dictionary terms each contain related terms that match the keys, server 306 may rank the two or more dictionary terms based on a number of matches and determine the highest ranked dictionary term to be relevant. In some embodiments, server 306 determine that dictionary terms are relevant to the user query based on a threshold number of matches between the related terms and the keys. In some embodiments, server 306 executes steps of process 700 described below with reference to FIG. 7.

In step 614, server 306 retrieves search terms. The search terms may be the relevant terms corresponding to the dictionary term determined to be relevant in step 612. In some embodiments, the relevant terms may be formatted to be usable by the one or more search algorithms or engines. For example, the relevant terms may be formatted into regular expressions (regex).

In step 616, server 306 matches the search terms retrieved in step 614 to contents stored in content DB 308. The contents may include reviews and comments left by reviewers using devices 314A-C. In some embodiments, the reviews and comments may be text strings processed and formatted for storage, searches, and retrieval.

In step 618, if there are contents matching the search terms in step 614, server 306 return the results to device 302. In some embodiments, the results returned to device 302 may include instructions to device 302 to display the content to the searcher on device 302. The instructions may include codes and web objects for generating a user interface displaying the results, such as one depicted in FIG. 5.

In some embodiments, if the user query contains auto-generated search terms, steps 604-612 may be skipped. For example, auto-generated search term may have a predefined relation to specific dictionary term in dictionary DB 310, thus server 306 may directly retrieve search terms corresponding that specific dictionary term in step 614.

Figure 7:
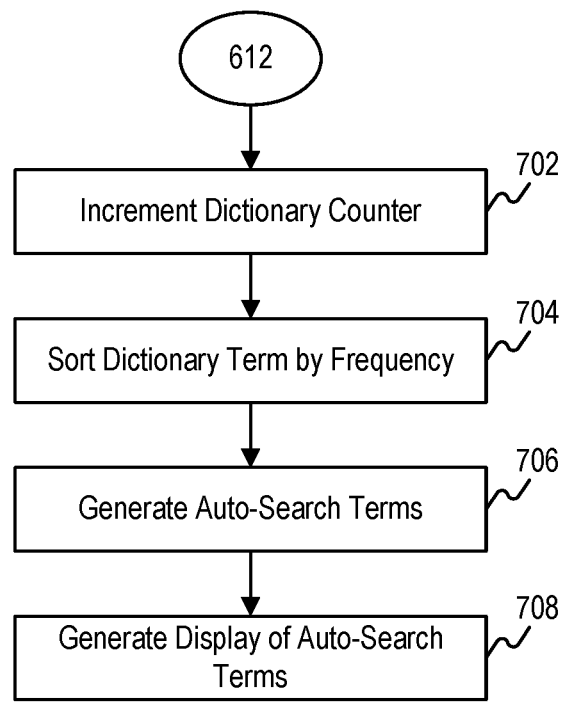
FIG. 7 depicts a flow chart of an exemplary process for generating auto-search terms, consistent with the disclosed embodiments.

Auto-generated search terms may represent features that are most often searched by users. FIG. 7 depicts a flow chart illustrating an exemplary process for auto-generating terms for searches, consistent with the disclosed embodiments.

Recall that in step 612, server 306 determines that a dictionary term is relevant to the user query. In step 702, based on that determination of step 612, server 306 increments a dictionary counter for the determined dictionary term. A dictionary counter may be a numerical value uniquely associated each of dictionary terms in the plurality of dictionaries stored in dictionary DB 310. Each instance that a dictionary term is determined to be relevant to a search, its dictionary counter may be incremented by one. Thus server 306 may track how often each dictionary term is relevant to a search for a particular SKU.

In step 704, server 306 sorts the dictionary terms by frequency. The frequency may refer to number of times the dictionary terms are determined to be relevant for a particular SKU, based on their respective dictionary counters.

In step 706, server 306 generates auto-search terms based on the sorted ranking of step 704. For example, the top one, two, three, or other ranked dictionary terms may become the auto-search terms. The auto-searched terms may be stored in SKU DB 312 so that they are associated with the corresponding SKU.

In step 710, server 306 generates instruction for a user interface on device 302, displaying the auto-search terms. The auto-search terms may be displayed using interactive graphic features capable of receiving direct user input. Examples of interactive graphic features may include, icons, drop-down list, pop-up menus, hyper-linked texts, and other graphic under interface functions and features. For example, an auto-search term may be displayed as button 504 on a touch interface on device 302, as illustrated in FIG. 5, so that when user press button 504, a search is performed using the auto-search term.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method of generating search results, comprising:
generating a plurality of dictionaries based on content data, in a content database, provided by one or more users, each of the plurality of dictionaries being associated with a product category associated with each Stock Keeping Unit (SKU) in a SKU database, each of the plurality of dictionaries comprising a plurality of dictionary terms and one or more related terms associated with each of the plurality of dictionary terms, wherein the one or more related terms are words which share similar meanings;

storing in a dictionary database, the plurality of dictionaries, wherein the plurality of dictionaries is generated by a machine learning process;

receiving, by a computing system, a user query from a client device over a network, the user query comprising user terms;

sending, to the SKU database, a SKU associated with the user terms;

receiving, from the SKU database, a product category associated with the SKU;

responsive to receiving the product category, generating, by the computing system, a dynamic search string by:
generating a key based on the user query;
identifying a dictionary from the plurality of dictionaries based on the product category;
determining, from the identified dictionary comprising the plurality of dictionary terms, a dictionary term corresponding to the key, the determination based on a number of matches between the key and the one or more related terms associated with the determined dictionary term exceeding a threshold; and
generating the dynamic search string based on one or more search terms associated with the determined dictionary term, the one or more search terms associated with the one or more related terms;

searching, by the computing system, using the dynamic search string, the content data;

returning, based on the search, search results comprising content from the content database matching at least one search term of the dynamic search string, wherein the search results are portions of product reviews in which the search term matches text strings of the product reviews;

generating, for display on a client device, the search results; and sending, for display, the search results to the client device.

2. The method of claim 1, wherein the user query comprises a user provided string.

3. The method of claim 2, further comprising:
updating the identified dictionary to include the user provided string.

4. The method of claim 2, further comprising:
generating a list of all user provided strings;
analyzing the list of all user provided strings to generate a list of common search strings; and
generating a list of auto-generated strings based on the list of common search strings.

5. The method of claim 1, wherein the user query comprises an auto-generated string, the auto-generated string being based on a previous user provided string.

6. The method of claim 1, wherein the content data comprises contents associated with a plurality of users relating to the SKU.

7. The method of claim 6, wherein the content data comprises product reviews relating to the SKU.

8. A computer system for generating search results, comprising:
one or more processors;
memory storage media containing instructions to cause the one or more processors to execute the steps of:
generating a plurality of dictionaries based on content data, in a content database, provided by one or more users, each of the plurality of dictionaries being associated with a product category associated with each Stock Keeping Unit (SKU) in a SKU database, each of the plurality of dictionaries comprising a plurality of dictionary terms and one or more related terms associated with each of the plurality of dictionary terms, wherein the one or more related terms are words which share similar meanings;

storing in a dictionary database, the plurality of dictionaries, wherein the plurality of dictionaries is generated by a machine learning process;

receiving, by a computing system, a user query from a client device over a network, the user query comprising user terms;

sending, to the SKU database, a SKU associated with the user terms;

receiving, from the SKU database, a product category associated with the SKU;

responsive to receiving the product category, generating, by the computing system, a dynamic search string by:
generating a key based on the user query;
identifying a dictionary from the plurality of dictionaries based on the product category;
determining, from the identified dictionary comprising the plurality of dictionary terms, a dictionary term corresponding to the key, the determination based on a number of matches between the key and the one or more related terms associated with the determined dictionary term exceeding a threshold; and
generating the dynamic search string based on one or more search terms associated with the determined dictionary term, the one or more search terms associated with the one or more related terms;

searching, by the computing system, using the dynamic search string, the content data;

returning, based on the search, search results comprising content from the content database matching at least one search term of the dynamic search string, wherein the search results are portions of product reviews in which the search term matches text strings of the product reviews;

generating, for display on a client device, the search results; and sending, for display, the search results to the client device.

9. The computer system of claim 8, wherein the user query comprises a user provided string.

10. The computer system of claim 9, further comprising:
updating the identified dictionary to include the user provided string.

11. The computer system of claim 9, further comprising:
generating a list of all user provided strings;
analyzing the list of all user provided strings to generate a list of common search strings; and
generating a list of auto-generated strings based on the list of common search strings.

12. The computer system of claim 8, wherein the content data comprises contents associated with a plurality of users relating to the SKU.

13. The computer system of claim 12, wherein the content data comprises product reviews related to the SKU.

14. The computer system of claim 8, wherein the user query comprises an auto-generated string, the auto-generated string being based on a previous user provided string.

15. A non-transitory computer-readable medium comprising instructions, that when executed by one or more processors, cause the one or more processors to perform the steps of:
- generating a plurality of dictionaries based on content data, in a content database, provided by one or more users, each of the plurality of dictionaries being associated with a product category associated with each Stock Keeping Unit (SKU) in a SKU database, each of the plurality of dictionaries comprising a plurality of dictionary terms and one or more related terms associated with each of the plurality of dictionary terms, wherein the one or more related terms are words which share similar meanings;
- storing in a dictionary database, the plurality of dictionaries, wherein the plurality of dictionaries is generated by a machine learning process;
- receiving, by a computing system, a user query from a client device over a network, the user query comprising user terms;
- sending, to the SKU database, a SKU associated with the user terms;
- receiving, from the SKU database, a product category associated with the SKU;
- responsive to receiving the product category, generating, by the computing system, a dynamic search string by:
  - generating a key based on the user query;
  - identifying a dictionary from the plurality of dictionaries based on the product category;
  - determining, from the identified dictionary comprising the plurality of dictionary terms, a dictionary term corresponding to the key, the determination based on a number of matches between the key and the one or more related terms associated with the determined dictionary term exceeding a threshold; and
  - generating the dynamic search string based on one or more search terms associated with the determined dictionary term, the one or more search terms associated with the one or more related terms;
- searching, by the computing system, using the dynamic search string, the content data;
- returning, based on the search, search results comprising content from the content database matching at least one search term of the dynamic search string, wherein the search results are portions of product reviews in which the search term matches text strings of the product reviews;
- generating, for display on a client device, the search results; and
- sending, for display, the search results to the client device.

* * * * *